United States Patent [19]

Aitken

[11] 3,801,974

[45] Apr. 2, 1974

[54] VOLTAGE RESPONSIVE ALARM SYSTEM FOR TELEPHONE LINES

[75] Inventor: Donald F. Aitken, Columbus, Ohio

[73] Assignee: Applied Sciences, Inc., Columbus, Ohio

[22] Filed: Mar. 6, 1972

[21] Appl. No.: 232,100

[52] U.S. Cl. .......................... 340/248 B, 178/69 G

[51] Int. Cl. .......................................... G08b 21/00

[58] Field of Search........ 340/248, 253, 213 R, 371, 340/237 S; 178/69 G; 317/3.3 SC, 148.5 B

[56] References Cited

UNITED STATES PATENTS

| | | | |
|---|---|---|---|
| 3,573,780 | 4/1971 | Butterbaugh | 340/248 B |
| 3,189,788 | 6/1965 | Cady | 340/248 B X |
| 3,314,058 | 4/1967 | Osborne | 340/237 S UX |
| 3,469,250 | 9/1969 | Voigt | 340/237 S |
| 3,430,218 | 2/1969 | Healey | 340/213 R |

*Primary Examiner*—John W. Caldwell
*Assistant Examiner*—Daniel Myer
*Attorney, Agent, or Firm*—Mahoney, Miller & Stebens

[57] ABSTRACT

An electrical alarm system is provided for responding to a telephone communication line normally having an operating voltage of predetermined magnitude to indicate loss of or removal of this voltage. This system includes an electrical power supply for energizing alarm apparatus independently of the telephone communication line voltage and a switching circuit responsive to the line voltage and operable to interconnect the power supply and alarm apparatus for energization thereof when the telephone communication line voltage has been removed or otherwise eliminated. The switching circuit includes a solid state switching device that is normally biased to a non-conducting state through a biasing circuit having voltage limiting and regulating means and a full wave rectifier.

9 Claims, 1 Drawing Figure

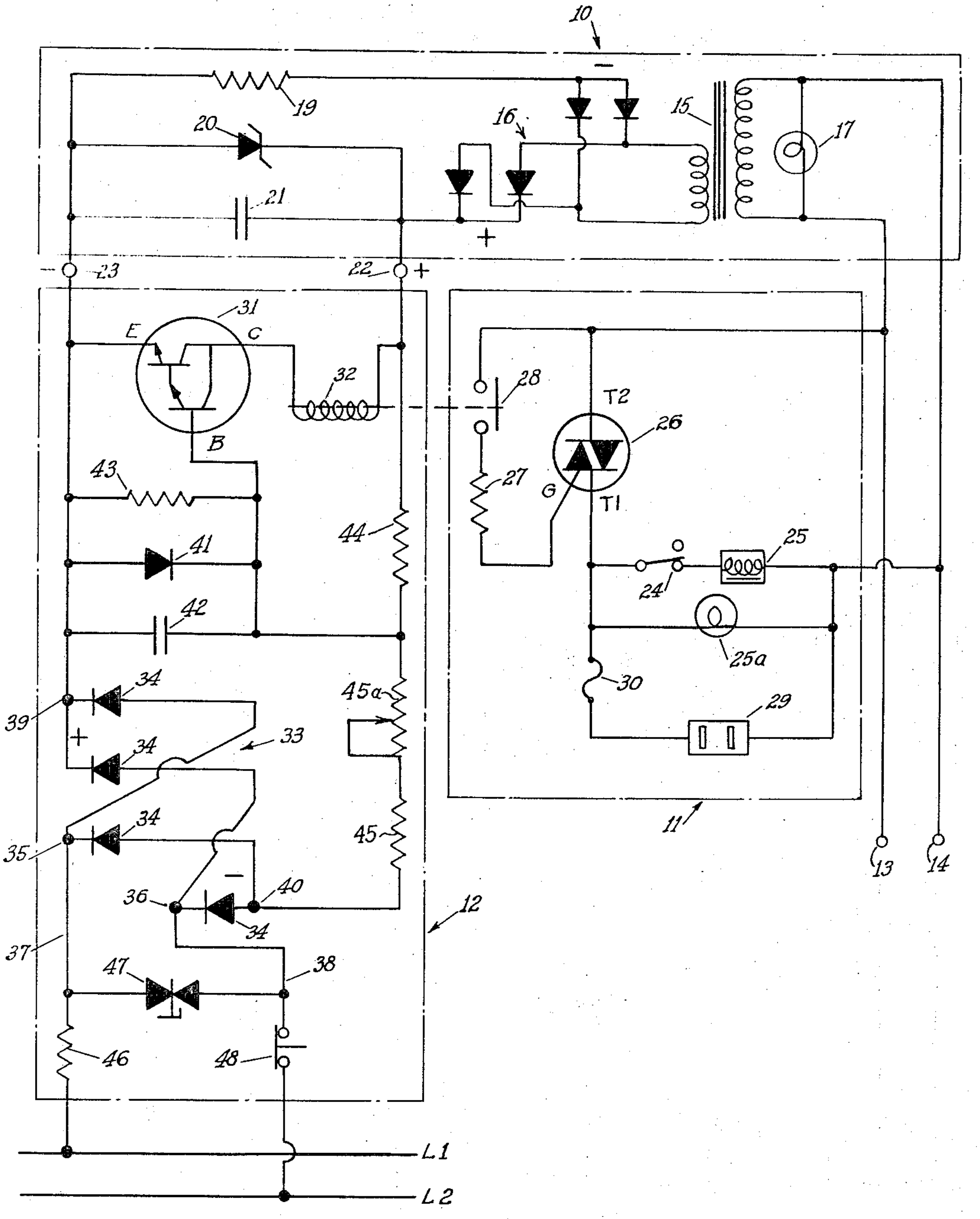
10
19
20
16
15
17
21
+
23
22
+
31
E
C
32
28
T2
26
B
43
27
G
T1
41
44
24
25
42
25a
34
45a
30
39
29
+
34
33
11
34
35
45
13
14
36
40
34
12
37
47
38
46
48
L1
L2

VOLTAGE RESPONSIVE ALARM SYSTEM FOR TELEPHONE LINES

BACKGROUND OF THE INVENTION

Communication lines such as the ordinary residence telephone have become subject to disruption in an increasing number of instances as from mechanical and electrical malfunctions and particularly in the case of burglaries and robberies. The objective in the latter instances is to prevent the victim from calling for assistance either during the burglarly or immediately thereafter and the burglar takes the precaution of disconnecting the telephone lines. There are also numerous cases of inadvertant mechanical and electrical malfunctions such as may be occasioned by windstorm damage. Irrespective of the specific cause of the disruption, the telephone subscriber will be without telephone service, perhaps at a time when assistance will be urgently needed, and will not be aware that the telephone communication lines have been disrupted until such time as it is desired to utilize the telephone.

BRIEF DESCRIPTION OF THE INVENTION

The electrical alarm system provided by this invention is responsive to disruption of the telephone line with which it is interconnected by actuation of alarm apparatus whenever the electrical voltage at the point of interconnection is removed or is absent for a predetermined minimum time. The alarm apparatus which may be visual or aural, or both is actuated in response to this voltage loss thereby signalling the telephone subscriber that his telephone service has been disrupted. Interconnection of the alarm system of this invention with the telephone communication lines is made at a point, usually inside the residence, such that the point of disruption will result in elimination of any normal telephone line voltage with respect to the alarm system and actuation of the alarm apparatus. Thus, anyone inside the residence would be immediately advised of disruption of telephone disruption and could take appropriate action.

Forming an important part of this alarm system is an electronic switching circuit that is responsive to the absence of telephone line voltage to effect energization of the alarm apparatus. To enable the apparatus to accommodate the substantial voltage variations as well as polarity reversals that occur during normal utilization of a telephone, the electronic switching circuit includes a full-wave rectifier and a voltage regulator which maintain a substantially constant bias voltage, both as to magnitude and polarity, with respect to the circuit switching device that is a solid state device. Stabilization of both voltage magnitude and polarity are necessary to prevent damage to the switching circuit and to prevent inadvertant operation as a consequence of normal use line voltage fluctuations in a telephone system that would otherwise prevent sensing or detection of this voltage. Additionally, the switching circuit is designed with a relatively high input impedance to prevent loading of the telephone circuit and interference with normal telephone operation.

These and other objects and advantages of this invention will be readily apparent from the following detailed description of an embodiment thereof and the accompanying drawing.

DESCRIPTION OF THE DRAWING

The sole FIGURE of the drawing comprises a schematic circuit diagram of an electrical alarm system embodying this invention.

DETAILED DESCRIPTION OF AN EMBODIMENT OF THE INVENTION

Referring to the drawing, the electrical alarm system of this invention includes, as the basic components thereof, an electrical power supply 10, alarm apparatus 11 and switching circuit 12. The power supply 10 is adapted for connection with a suitable source of electrical power, at the terminals 13 and 14, such as the usual 120 volt a.c. residential power system and includes a step-down transformer 15 and full wave rectifier 16 connected to the transformer secondary. A pilot light 17 may be connected across the transformer primary which is also connected to the terminals 13 and 14. Connected across the output terminals of the rectifier 16 is a resistor 19 in combination with a voltage regulating zener diode 20 and capacitor 21. Preferably, the power supply 10 is designed to provide an output of about 12 volts d.c. at its output terminals 22 and 23 for operation of the switching circuit 12 which is designed to operate without deriving any electrical power from the telephone communication lines $L_1$ and $L_2$.

Also deriving electrical power from the 120 volt a.c. source for its operation is the alarm apparatus 11 which, in this embodiment, comprises an electrically energized aural device 25 and a visual device *25a*, such as an indicator light. This illustrative aural device 25 is of the vibratory buzzer-type which may conveniently be mounted in the same unit housing as the remainder of the alarm system although it will be understood that other types of electrically actuated or operated devices may be substituted therefor as may be determined appropriate for a particular installation. A two position switch 24 is series connected with the aural device 25 and may optionally be opened after an initial indication of loss of electrical power on the communication lines $L_1$ and $L_2$ leaving the light *25a* illuminated to provide a continued warning. Series connected with the aural device 25 and visual device *25a* across the 120 volt a.c. power terminals is a bi-directional, controllable switching device 26 of the gated terminal type such as that commercially known as a Triac. A gating voltage is obtained from the 120 volt a.c. source through a series circuit including a current limiting resistor 27 and a normally open relay contact 28. Closing of the relay contact 28 will result in application of an appropriate gating voltage to the gate terminal of the Triac 26 which will then become conductive thereby energizing the aural device 25 and visual device *25a*. The aural device 25 will remain energized for so long a period of time as the relay contact 28 remains closed. Also, interconnected therewith in shunt relationship to the aural device 25 is a connector socket 29 which is preferably mounted in the units housing as to be readily accessible for interconnection with an auxiliary device that may be an external, remotely positioned alarm. A Triac is utilized as a switching device to enable the alarm circuit to handle relatively high currents for energization of any auxiliary device without requiring a high current rating relay and relay contact 28. If a particular embodiment is constructed without the socket 29, it may be that the electrical current requirements of the aural and visual devices 25 and **25*a* will be of a sufficiently low value to permit direct use of the low power-rated contacts 28 and consequent elimination of the Triac. A fuse 30 is interposed in circuit with the socket 29** to provide electrical protection from inadvertent interconnection of a relatively high current device with the alarm circuit.

Connected with the output terminals 22 and 23 of the power supply 10 and deriving electrical power therefrom for its operation is the switching circuit 12 which is coupled with the relay contact 28 and which is also electrically coupled with the telephone communication lines $L_1$ and $L_2$. Forming the operative components of the switching circuit are a solid state switching and amplifier device 31 and a relay coil 32 which is coupled with the normally open contacts 28. Preferably, the relay coil 32 and associated contacts 28 comprise a magnetic reed relay to provide positive electrical isolation between the communication lines and electrical power source. The switching device 31 is a dual transistor unit that may advantageously be formed by integrated circuit techniques as a Darlington amplifier with the emitter-collector terminals being series connected with the relay coil 32 across the power supply terminals 22 and 23. The electrical characteristics of the device 31 are that with adequate emitter-base bias the device will be cut-off and non-conducting thereby leaving the relay coil 32 deenergizecd. Removal of this emitter-base bias as described hereinafter will permit reversion of the switch device to a conductive state thereby causing energization of the relay coil 32 and consequent closing of contacts 28.

A biasing voltage is obtained from the telephone communication lines $L_1$ and $L_2$ through a biasing circuit that is responsive to the voltage appearing on the communication lines. Included in this biasing circuit is a full wave rectifier 33 comprising four solid-state diodes 34 connected in a bridge circuit with the input terminals 35 and 36 connected across the lines $L_1$ and $L_2$ through the conductors 37 and 38. The rectifier 33 assures that proper polarity voltage will always be applied to the switch device 31 irrespective of the communication line voltage at any particular instant. This voltage rectification is particulary advantageous as the communication line voltage does reverse as between the various telephone operating cycles and also eliminates any problems in determining the appropriate connection to the lines $L_1$ and $L_2$.

Connected to the output terminals 39 and 40 is a biasing network including a solid state diode 41 connected across the emitter-base terminals of the switch device 31 to provide a reverse bias or or cutoff voltage due to the forward voltage drop across this diode. This forward voltage drop remains at a relatively constant magnitude of the order of 0.8 – 1.2 volts regardless of any communication line voltage fluctuations which normally vary over a range of −10 to +50 volts d.c. as determined by the particular telephone operation cycle. Connected in shunt relationship with the diode 41 is a capacitor 42 which provides a delay in loss of bias voltage for a predetermined interval if the communication line voltage should be momentarily lost as occurs during a dialing operation. This capacitor is of a value selected to provide the necessary delay. A resistor 43 is also connected in shunt relationship to the diode 41 to provide the necessary biasing of the switch device 31 to a fully conductive state in the absence of any voltage on the communication lines $L_1$ and $L_2$ and to more fully assure that the switch device 31 will be biased to a non-conductive state when the communication lines voltage is of a low magnitude.

Unacceptable loading of the communication lines $L_1$ and $L_2$ during normal operation of the telephone system is prevented by the resistors **44, 45, 45*a* and 46 which cooperate with the rectifier and biasing network to provide a relatively high input impedance. This input impedance through appropriate selection of the resistances can easily be made to be of the order of a few hundred thousand ohms. Resistance 45*a* is of a selectively variable type and is series connected with fixed resistance 45 to provide adjustment of the sensitivity to accommodate voltage variations that exist between telephone systems that have only one telephone station and those that may have one or more stations or extensions. Selecting a combined resistance value for resistors 45 and 45*a* to provide the highest input impedance while preventing actuation of the alarm when a single telephone is in use may result in actuation of the alarm if one or more extensions are simultaneously used as a consequence of lowering of the voltage. Providing a variable resistance 45a** facilitates adjustment of the circuit to maintain the highest impedance for the maximum number of extensions expected to be utilized at any one time.

Further protection of the system, particularly the solid state switch device 31, against excessive voltages is provided by a thyrector 47. The thyrector is connected across the conductors 37 and 38 before the rectifier 33 and prevents application of high voltages to the system such as may be occasioned by lighting. Preferably, the thyrector 47 is selected to have an operating characteristic that limits circuit voltages to about 30 volts d.c.

A normally closed push-button manual switch 48 is series connected in the one conductor 38 to rpovide a means of conveniently testing the operation of the system. Opening of the switch 48 will prevent application of any voltage to the system to result in operation of the system as in the case of actual loss of communication line voltage.

Operation of the system can be readily understood with it being assumed that the terminals 13 and 14 are connected to a suitable power source. With the conductors 37 and 38 connected to the telephone communication lines $L_1$ and $L_2$ leading to the telephone it is desired to protect, it is also assumed that the usual voltage is on the communication lines. This voltage results in the application of a reverse bias to the emitter-base terminals of the solid state switch 31 thereby maintaining the device in a cutoff state. The d.c. voltage supplied at the terminals 22 and 23 of power supply thus will not be effective in energizing the relay coil 32 since the switch device 31 in non-conducting at this time. Relay contact 28 will remain open and the alarm apparatus 11 will remain inoperative. Loss of voltage on the communication lines $L_1$ and $L_2$ for any reason, other than a momentary delay accommodated by the capacitor 42, will result in loss of the emitter-base bias normally provided by the diode 41 and resistor 43 and the switch device 31 will change to a conducting state thereby energizing the relay coil 32. Relay contacts 28 will then close gating the Triac 26 to a conductive state and the aural alarm device 25 and visual device **25*a* will be energized and electrical power will be avialable at the connector socket 29.** This condition will remain for so long as there is an absence of voltage on the communication lines $L_1$ and $L_2$.

It will be readily apparent that a novel electrical alarm system is provided for protecting a communication system such as a telephone with this alarm system capable of responding to a loss of telephone line voltage but accommodating the telephone line voltage fluctuations and reversals. The alarm system also provides a relatively high input impedance to prevent unacceptable loading of the communication lines.

Having thus described this invention, what is claimed is:

1. An electrical alarm system for responding to loss of communication line voltage comprising:

A. an electrical power supply,

B. alarm apparatus selectively connectable with said power supply to receive electrical power for energization, C. a switching circuit interconnected with said power supply and alarm apparatus and operable to effect selective energization thereof, said switching circuit including:

1. normally closed switch means responsive to a biasing voltage to switch to an open, nonconducting state, said switch means operatively connected to said power supply and said alarm apparatus for selective interconnection thereof, and 2. a voltage biasing circuit electrically isolated from said power supply adapted to be connected to a communication line and connected with said switch means to provide a biasing voltage to said switch means independent of the magnitude of said power source when a voltage is impressed on the communication line, said biasing circuit including a voltage rectifier connected in preceding relationship to said switch means and voltage regulating means limiting the biasing voltage applied to said switch means to a predetermined maximum value.

2. An electrical system according to claim 1 wherein said switch means is a solid state switching device having emitter-base terminals, said biasing circuit connected across said emitter-base terminals.

3. An electrical alarm system according to claim 2 wherein said biasing circuit includes a solid state diode connected across said emitter-base terminals to provide a reverse bias to the switching device when said diode is conducting in a forward direction.

4. An electrical alarm system according to claim 3 wherein said biasing circuit includes a capacitor connected in shunt relationship to said diode.

5. An electrical alarm system according to claim 3 wherein said voltage rectifier is connected across said diode.

6. An electrical alarm system according to claim 1 having a voltage limiting device connected in shunt relationship with said switching circuit.

7. An electrical alarm system according to claim 1 wherein said switching circuit includes impedance means forming a high input impedance.

8. An electrical alarm system according to claim 7 wherein said impedance means includes selectively adjustable impedance means for sensitively adjustment.

9. An electrical alarm system according to claim 1 wherein said alarm apparatus includes a visual device and an aural device, and switch means connected in circuit with said aural device to selectively prevent energization thereof.

* * * * *